United States Patent [19]

Orlandi

[11] Patent Number: 5,213,134
[45] Date of Patent: May 25, 1993

[54] CONTROL UNIT FOR THE DELIVERY OF HOT AND COLD WATER IN MIXER VALVES

[75] Inventor: Alessio Orlandi, Castiglione D/Stiviere, Italy

[73] Assignee: Galatron S.r.l., Via Dell'Artigianato, Italy

[21] Appl. No.: 854,340

[22] Filed: Mar. 19, 1992

[30] Foreign Application Priority Data

Mar. 22, 1991 [IT] Italy .................. BS/91/U/000028

[51] Int. Cl.⁵ ..................................... F16K 11/078
[52] U.S. Cl. ........................... 137/625.4; 137/625.17
[58] Field of Search ............ 137/625.4, 625.41, 625.17

[56] References Cited

U.S. PATENT DOCUMENTS

| | | | |
|---|---|---|---|
| 3,667,503 | 6/1972 | Farrell et al. | 137/625.4 |
| 4,883,090 | 11/1989 | Kitamura et al. | 137/625.41 |
| 4,887,642 | 12/1989 | Bernat | 137/625.41 |
| 4,960,154 | 10/1990 | Dagiantis | 137/625.4 X |
| 4,997,005 | 3/1991 | Pawelzik et al. | 137/625.4 X |

FOREIGN PATENT DOCUMENTS 2182419  5/1987  United Kingdom ............ 137/625.4

*Primary Examiner*—Arnold Rosenthal
*Attorney, Agent, or Firm*—McGlew & Tuttle

[57] ABSTRACT

The invention relates to a control unit for the delivery of hot and cold water in mixer valves having two overlapping plates (11, 12) one of which is fixed and the other movable on the fixed one and in which the fixed plate has an outlet hole or opening (17) made from a semicircular side (17a) placed between two arched water inlet holes or openings (15, 16) with its center being in the center of the fixed plate and a side which extends and widens in a fan-shape in the other half of the fixed plate, symmetrically in respect to the axis of said plate passing through said two arched holes or openings.

11 Claims, 3 Drawing Sheets

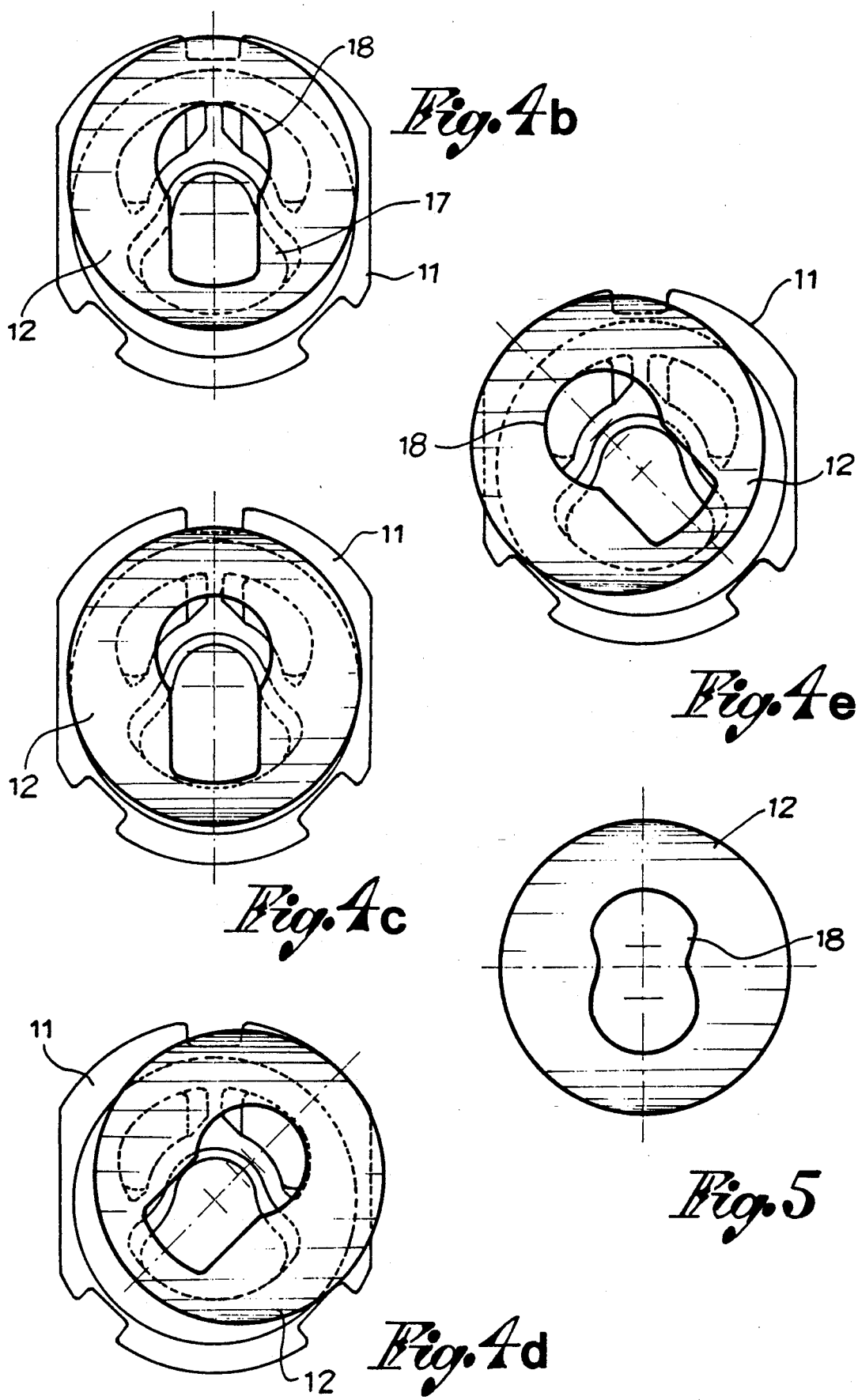

CONTROL UNIT FOR THE DELIVERY OF HOT AND COLD WATER IN MIXER VALVES

FIELD OF THE INVENTION

The present invention relates to single control mixer valves for hot and cold water and in particular to a control unit for the delivery and mixing of the two types of water in the valves and usually including two plates made of ceramic materials or the like. Cartridge-type mixer valves for hot and cold water in fact incorporate a valvular mixer unit made from two overlapping plates, one being fixed and the other movable both radially and in rotation on and with respect to the fixed one.

BACKGROUND OF THE INVENTION

The fixed plate usually has two water inlet holes respectively joining two separate pipes for hot and cold water and one hole for the outlet of the water towards the mouth of a delivery tap to which the mixer valve is applied.

As far as the movable plate is concerned, it is operated through a control rod and has a mixing chamber designed to selectively join one or both the water inlet holes with the water outlet hole.

However, the shape of the holes or openings in the overlapping plates in units available at present do not contribute to reaching optimum capacity and mixing conditions of the water unless plates are of a relatively large diameter, in order that they can have wide holes. This results in that it is not possible to maintain the cartridge-type valve at the desired size.

SUMMARY AND OBJECTS OF THE PRESENT INVENTION

The present invention aims to solve these problems and thus to supply a control unit for the delivery of hot and cold water in mixer valves with improved capacity and mixing performances due to a particular and innovative arrangement and configuration of the holes or openings of said plates.

The employment of plates in accordance with the invention allows for the use of holes which better make use of available surface space and therefore reach the desired capacity, even with plates being of a smaller diameter, so as to advantageously reduce the volume and dimensions of the valves incorporating such plates. The here proposed realization also allows for an improved mixing of water, and maintaining a satisfactory so-called safety space due to a reduction of the divide cap cusp between the holes or openings of the fixed plate.

In the present invention there is a fixed plate which is rigidly mounted to a housing body. This fixed plate defines first and second inlet openings and an outlet opening. The inlet openings are divided by the divide cap and the inlet openings extend substantially symmetrically away from the divide cap in circumferential arc shapes. These inlet openings or holes are positioned in a first half of the fixed plate. The outlet opening has a semicircular portion position positioned between the first and second inlet openings. A center of the semicircular portion being substantially aligned with a center of the fixed plate. The outlet portion also has a fan-shape portion which extends and widens from the semicircular portion. The fan-shape portion is symmetrical with respect to a radial axis passing through the divide cap. The fan-shaped portion is positioned on the fixed disc in an area or second half which is substantially opposite to the area or first half of the fixed disc which has the inlet openings. A movable plate is movably mounted in the housing and movably positioned adjacent to, and with respect to, the fixed plate. The moveable plate defines a mixing chamber which can provide various degrees of communication between each of the inlet openings and the outlet opening. The mixing chamber having a shape that is substantially symmetrical about a radial axis of the moveable plate. The mixing chamber is radially contained inside the moveable plate and does not radially extend outside of the moving plate. The mixing chamber itself can be considered closed by the moveable plate, in the plane of the movable plate. The mixing chamber itself has two portions. A substantially circular portion and a substantial polygonal portion. The substantially circular portion has a center eccentric or spaced from the center of the moveable plate. The substantially polygonal portion is connected to the substantially circular portion. The movable plate is positioned so that the substantially circular portion can come into and out of communication with the inlet openings when the moveable plate is moved. The substantially polygonal portion is connected to the substantially circular portion in a position so that the substantially polygonal portion is in communication with the outlet opening when the movable plate is moving. This shape of the mixing chamber having a substantially circular portion and a substantially polygonal portion is one of the preferred embodiments.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 5 is a view of the lower surface of the movable plate in another embodiment;

DETAILED DESCRIPTION OF THE PREFERRED EMBODIMENT

Figure 1:
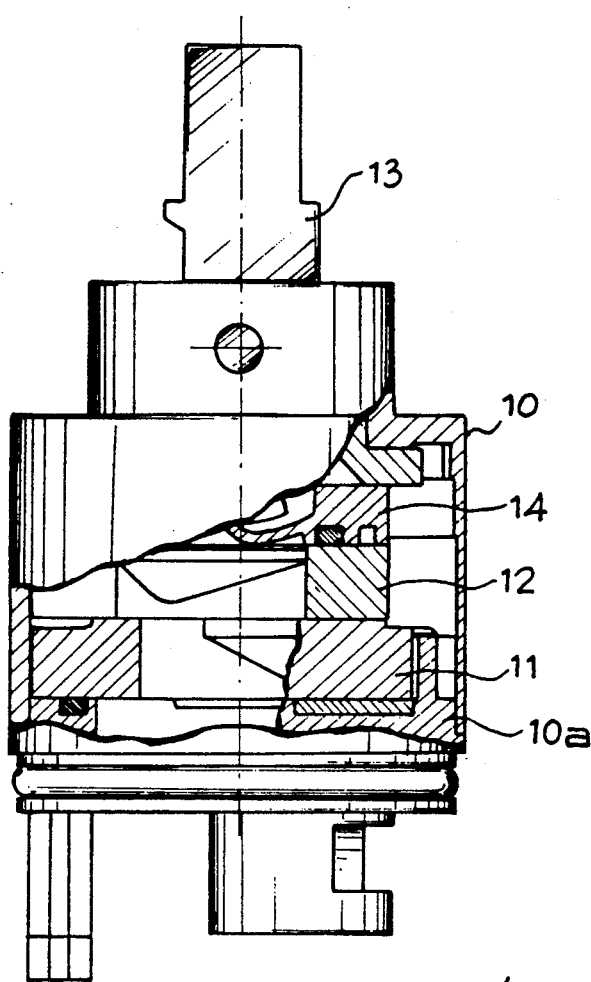
FIG. 1 is an axial section view of an example of a mixer valve incorporating the fixed and movable plates in accordance with the invention.

A valve with a cartridge-type body 10 holds a lower fixed plate 11 blocked to the bottom 10a of the body and a movable plate 12 which rests against and is both radially and rotatingly movable on the fixed plate 11. The upper movable plate 12 is operated through a control rod 13 which is indirectly connected to the movable plate 12 by a hooked plate cover element 14.

The fixed plate 11 has two holes or openings 15, 16 which are joined by two corresponding separate pipes (not shown) for hot and cold water and the fixed plate 11 also has a hole 17 for the outlet of hot, cold or mixed water towards a delivery mouth. In turn, the movable plate 12 has a mixing chamber 18 which is open towards the fixed plate 11 and closed at the top by the plate cover 14. Depending on the position of the movable plate in relation to the fixed plate, the mixing chamber 18 can fully close any passage or totally or partially join one or both holes 15 and 16 for the inlet of water with the outlet hole 17 so as to deliver hot, cold or mixed water.

The two holes or openings 15, 16 of the fixed plate 11 are formed in an arch-shape on one half of the plate and symmetrically in respect to a divide cap 19 which is placed or extends radially. The holes or openings 15, 16 extend in an arc and through an angle starting from the divide cap 19 in opposite directions, each one in an arch of 90° or less. The divide cap 19 tapers or narrows upwards towards the movable plate from the bottom. The taper forms a cusp 19a at the movable plate 12 which reduces the space between one inlet hole and the other and therefore forming the so-called safety space.

Figure 2:
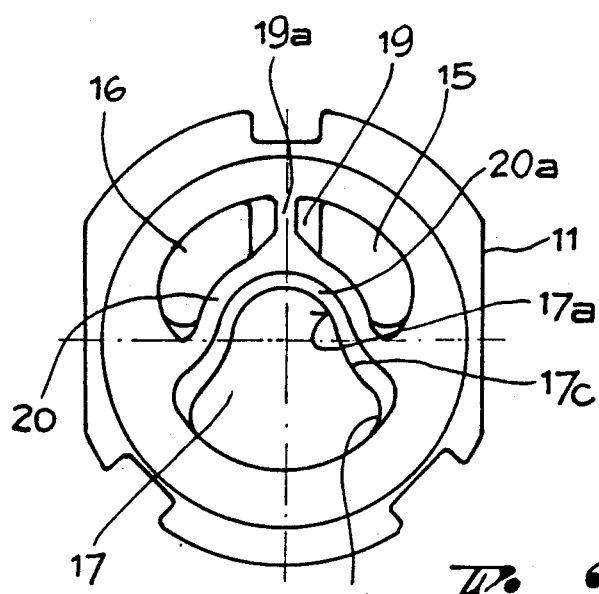
FIG. 2 is a view of the top surface of the fixed plate.

The hole or opening 17 of the fixed plate 11, (FIG. 2), has semicircular side or portion 17a, with its center coinciding with the center of the plate, and another side or portion 17b widening in a fan-shape in the half of the fixed plate which is opposite to the half in which the holes openings 15, 16 are formed.

The semicircular side 17a and the fan-shaped side 17b joining through divergent or parallel sides 17c. The semicircular side 17a is positioned between the two arched inlet holes or openings 15, 16 and is separated by a partition 20, whilst the fan-shaped side 17b of said hole 17 extends away from said arched holes or openings, widening symmetrically in respect to an axis of the plate 11 passing through the cusp 19a. The partition 20 between the outlet hole 17 and the inlet openings 15, 16 also tapers upwards, in other words towards the movable overlapping plate 12 with a bevel 20a formed at least on the side of the outlet hole and at least at the same height or area of the semicircular side 17a.

Figure 3:
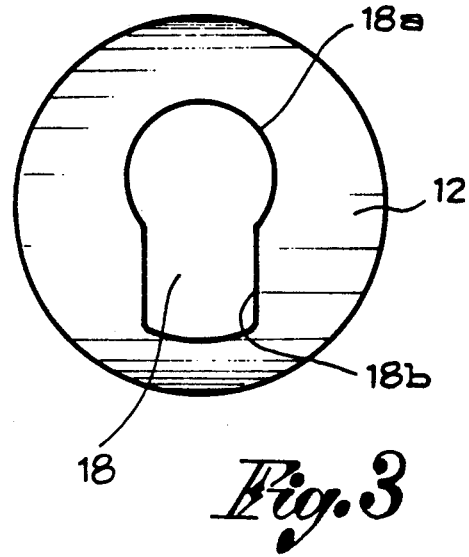
FIG. 3 is a view of the lower surface of the movable plate in a first embodiment.

As far as the mixing chamber 18 in the movable plate 12 is concerned, the realizations (FIGS. 3 and 4) are of a general key hole shape with a circular side or portion 18a with a smaller radius than the minimum radius of the arched inlet holes or openings 15, 16 and not in line with the geometrical center of the plate itself, and a polygonal-shaped portion 18b on the other side. The opposite sides of the hole or opening 18 can be flared in an upwards direction, in other words towards the plate cover 14.

Figure 4A:
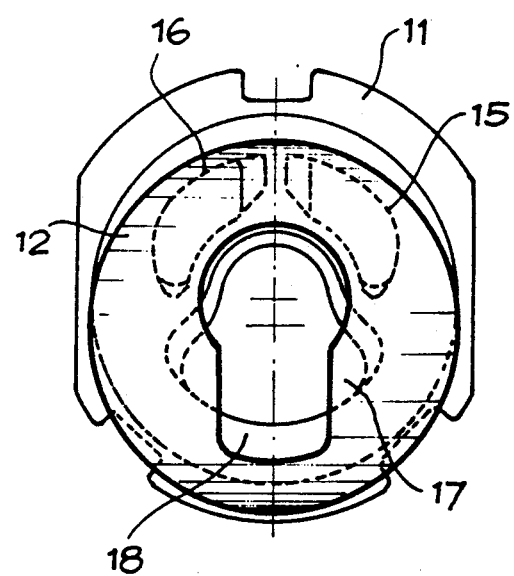
FIGS. 4a, b, c, d, e are different positions of the movable plate on the fixed one respectively in fully closed, fully open and half open mixing conditions and fully open for the delivery of only hot water or only cold water.
Figure 6A:
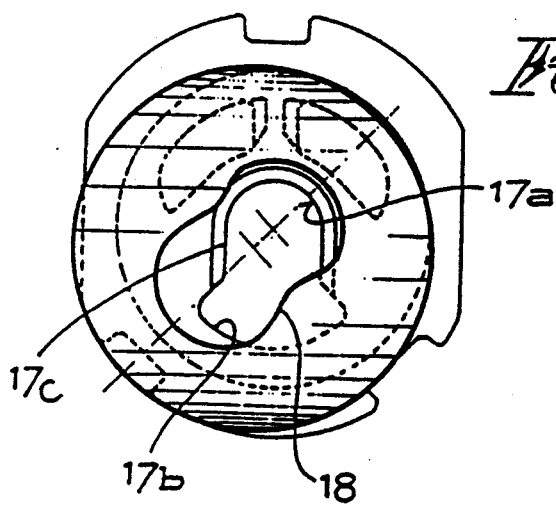
FIGS. 6a, b are two different positions of the movable plate in FIG. 5 on the fixed plate, respectively in fully closed and fully open mixing conditions.
Figure 8B:
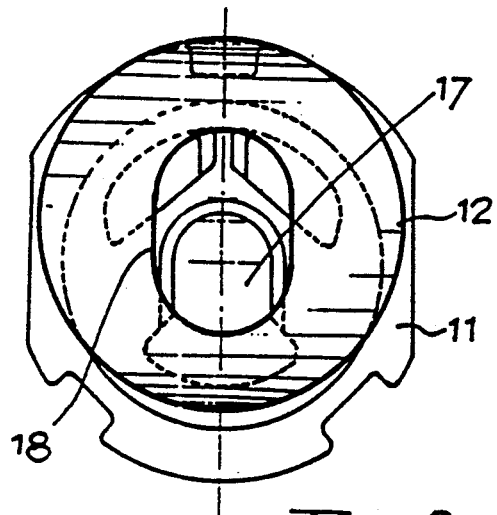
FIGS. 8a, b are two different positions of the movable plate in FIG. 7 on the fixed plate, respectively in fully closed and fully open mixing conditions.
Figure 6B:
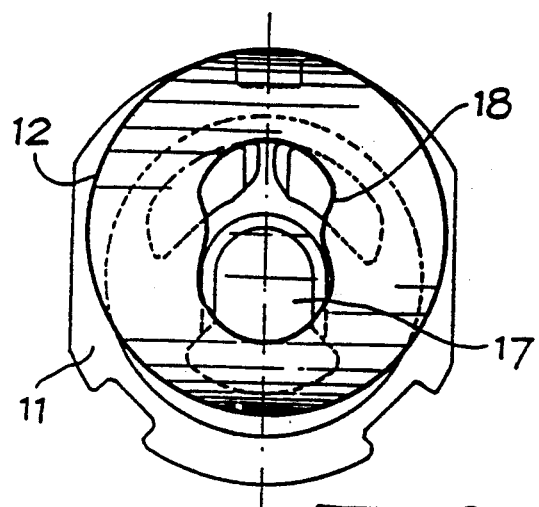
Figure 8A:
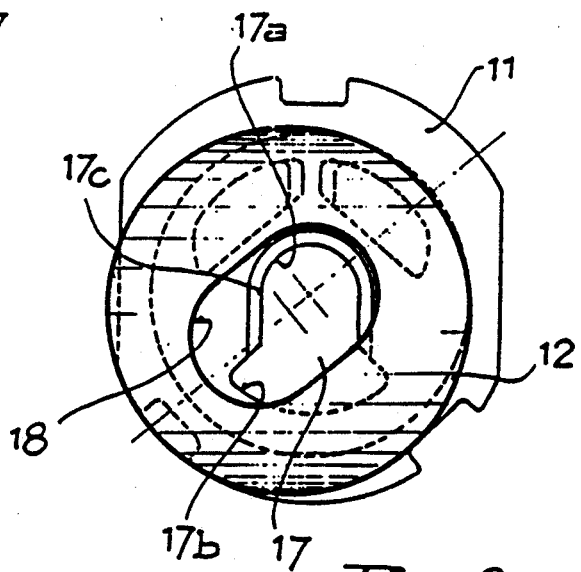

FIGS. 4a, b, c, d, e illustrate various interacting conditions between the two overlapping plates, especially of the mixing chamber 18 with the holes or openings 15, 16, 17. The conditions depend on the position of the movable plate 12 on the fixed plate 11 so as to obtain: the complete closure of the valve (FIG. 4a); the maximum opening for the delivery of mixed water (FIG. 4b); an intermediate opening for the delivery of a limited amount of mixed water (FIG. 4c); the maximum opening for the delivery of only hot water (FIG. 4d); the maximum opening for the delivery of only cold water (FIG. 4e).

For the delivery positions of the water, the circular side or portion 18a of the chamber 18 covers the inlet holes whilst the remaining side or portion 18b always covers the outlet hole 17 totally making use of the fan-shaped side 17b in function of the positioning of the mixing chamber as can be seen from the drawing.

Figure 7:
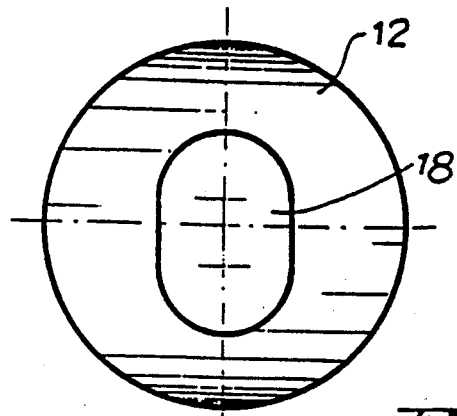
FIG. 7 is a view of the lower surface of the movable plate in yet another embodiment.

The mixing chamber 18 of the movable plate 12 can also have a figure-of-eight (FIG. 5) or an elliptic (FIG. 7) configuration but always maintaining the same intercepting conditions with the holes or openings 15, 16, 17 of the fixed plate 11 so as to ensure maximum capacity and best functioning:

I claim:
1. A valve comprising:
   a housing body:
   a fixed plate rigidly mounted in said housing body, said fixed plate defining first and second inlet openings, said first and second inlet openings being separated by a divide cap and extending substantially symmetrically in circumferential arcs from said divide cap, said first and second inlet openings being positioned in a first half of said fixed plate, said fixed plate also defining an outlet openings, said outlet opening having a semicircular portion positioned between said first and second inlet openings, said semicircular portion having a center substantially positioned in a center of said fixed plate, said outlet opening also having a fan shape portion which extends and widens from said semicircular portion, said fan shape portion being symmetrical with respect to a radial axis passing through said divide cap and being positioned in a second half of said fixed plate substantially opposite to said inlet openings; and
   a movable plate movably mounted in said housing body and movably positioned adjacent to said fixed plate, said movable plate defining a mixing chamber, said mixing chamber having a shape providing various degrees of communication between said first and second inlet opening and said outlet opening dependent on a position of said movable plate with respect to said fixed plate, said mixing chamber having a shape substantially symmetrical about a radial axis of said movable plate.

2. A valve in accordance with claim 1, wherein:
   said semicircular portion and said fan-shaped portion of said outlet opening are joined to each other by two diverging sides.

3. A valve in accordance with claim 2, wherein:
   said diverging sides are substantially straight.

4. A valve in accordance with claim 2, wherein:
   said diverging sides are curved.

5. A valve in accordance with claim 1, wherein:
   said outlet opening of said fixed plate has a bevel on said semicircular portion and towards a surface of said fixed plate on which said movable plate moves.

6. A valve in accordance with claim 1, wherein:
   said divide cap tapers towards a surface of the fixed plate on which the movable plate moves.

7. A valve in accordance with claim 1, wherein:

said mixing chamber of said movable plate has a circular portion which is eccentric with respect to a center of said movable plate and is joined with a polygonal portion, said circular portion being turned towards and covering said inlet openings whilst said polygonal portion covers said fan-shaped portion of said outlet opening.

8. A valve in accordance with claim 1, wherein:

said mixing chamber is radially contained inside said movable plate, and said mixing chamber has a substantially circular portion, said substantially circular portion having a center spaced from a center of said movable plate, said mixing chamber also having a substantially polygonal portion connected to said substantially circular portion, said movable plate being positioned adjacent said fixed plate to have said substantially circular portion be positionable in and out of communication with one of said inlet openings during moving of said movable plate, said substantially polygonal portion being positioned with respect to said substantially circular portion to be in communication with said outlet opening during said moving of said movable plate.

9. A valve in accordance with claim 8, wherein:

a dimension of said substantially polygonal portion is less than a diameter of said substantially circular portion, and said mixing chamber forms a substantially key-hole shape.

10. A control unit in accordance to claim 1, characterized in that the mixing chamber (18) of the movable plate (12) has a figure-of-eight configuration defined by two circular intersecting sides.

11. A control unit in accordance to claim 1, characterized in that the mixing chamber (18) of the movable plate (12) has an elliptic shape.

* * * * *